Dec. 25, 1934.　　　　R. P. LANSING　　　　1,985,662
TRANSMISSION
Filed Oct. 20, 1931
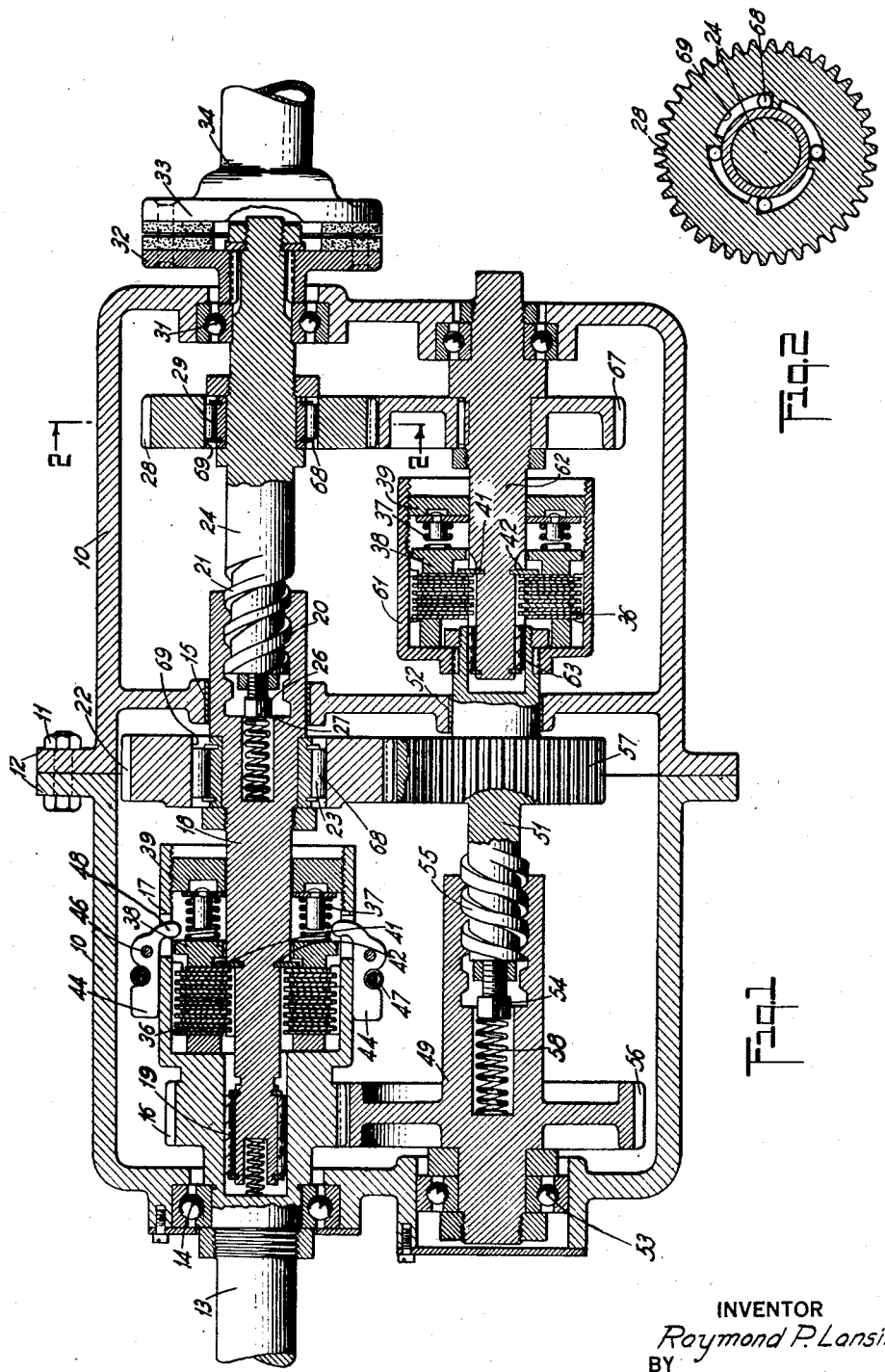
INVENTOR
Raymond P. Lansing
BY
Warren T. Hunt
ATTORNEY Patented Dec. 25, 1934

1,985,662

UNITED STATES PATENT OFFICE 1,985,662

TRANSMISSION

Raymond P. Lansing, Montclair, N. J., assignor, by mesne assignments, to Eclipse Aviation Corporation, East Orange, N. J., a corporation of New Jersey Application October 20, 1931, Serial No. 569,990

14 Claims. (Cl. 74—336)

This invention relates to power transmission mechanism, and more particularly to an automatic speed changing transmission mechanism.

An object of the invention is to provide transmission mechanism that automatically changes the driving ratio at a predetermined resistance of the driven shaft.

Another object of the invention is to provide a transmission mechanism that automatically changes the driving ratio by graduated steps in accordance with the resistance of the driven shaft.

Another object of the invention is to provide an automatic transmission with a means for preventing automatic speed changes above a predetermined driving speed, whereby an automotive vehicle incorporating the improved transmission may be driven in the high gear position above a predetermined speed of the driving shaft, irrespective of the driven shaft resistance.

Another object of the invention is to provide an automatic transmission in which the torque resistance necessary to produce gear changes is increased as the speed of the driving shaft is increased.

Other objects of the invention will appear from the following description, in connection with which a preferred embodiment thereof has been illustrated in the accompanying drawing, in which:

Fig. 1 is a vertical sectional view through the improved transmission; and,

Fig. 2 is a sectional view of one of the overrunning clutches taken on the line 2—2 of Fig. 1.

Referring to the drawing, 10 is the transmission housing preferably formed in two parts, joined together by bolts 11 passing through flanges 12. Driving shaft 13 is rotatably mounted in casing 10 by bearing 14, upon which is a gear 16 having an extension 17 adapted to house a friction clutch, hereinafter more fully described.

A driven shaft 18 supported by bearing 15 is piloted within gear 16 by bearing 19 and is adapted to move axially with respect thereto, the shaft being normally positioned as shown in Fig. 1.

A gear 22 is secured to shaft 18 through an overrunning clutch 23, whereby shaft 18 may revolve relatively to gear 22 or be driven thereby. Driving shaft 18 preferably has its end portion internally threaded at 20, within which is a shaft 24 having corresponding threads 21 adapted to move shaft 18 axially with respect to driving shaft 13, the respective portions 18 and 24 being normally urged apart by a spring 26, the force of which is adjustable by screw 27 upon which the spring 26 acts.

Gear 28 is secured to shaft 24 through the medium of an overrunning clutch 29, similar to overrunning clutch 23, and is adapted to permit shaft 24 to overrun or be driven by gear 28, as the case may be. The outer end of shaft 24 is mounted in casing 10 by a bearing 31 and is provided with a flange 32, splined or otherwise secured thereto, adapted to form a portion of universal joint 33 that is secured to driven shaft 34.

Within housing 17 is a clutch, preferably of the friction type, the alternate plates 36 of which are feathered respectively to housing 17 and shaft 18. Clutch plates 36 are normally urged to their engaging position by springs 37 coacting between thrust member 38 and the adjustable collar 39 that is threaded in the housing 17. Shaft 18 is provided with a clutch releasing member, preferably comprising split washers 41, that are fitted within grooves 42 formed in shaft 18, washers 41 normally having a slight clearance with respect to thrust member 38 and adapted to contact the same and force the collar toward the right upon movement of shaft 18, as viewed in Fig. 1, which movement results in a release of the clutch and a disengagement of shafts 13 and 18.

Centrifugal weights 44 are pivotally mounted upon housing 17 by pins 46 and are normally urged to their inner position by spring 47, preferably in the form of an endless helix. The inner ends 48 of weights 44 are adapted to contact thrust member 38 and force it toward the left to increase the resistance of the clutch to disengage as the outward force of weights 44 is increased by an increase in speed.

A countershaft having aligned portions 49 and 51 is mounted in casing 10 by bearings 52 and 53, the portions 49 and 51 having a threaded engagement with each other at 55 and normally urged apart by a spring 58, preferably having a greater compression force than spring 26 and adapted to urge shafts 49 and 51 apart at some predetermined pressure defined by the position of adjusting screw 54. Shaft 49 is provided with a gear 56 in constant mesh with gear 16, and shaft 51 is provided with a gear 57 in constant mesh with gear 22, whereby when clutch members 36 are disengaged, the drive may be taken from shaft 13 through gears 16 and 56 and back to shaft 34 either by gears 57 and 22 or by gears 67 and 28.

The outer end of shaft 51 is provided with a housing 61, enclosing similar clutch parts to the clutch above described, the only material difference being the omission of centrifugal weights 44. A countershaft 62 similar to the main shaft portion 18 is pivoted within the housing 61 by bearing 63 in a manner to be axially slidable with respect to the housing and adapted to remain stationary when housing 61 is shifted toward the left by the telescoping of shafts 51 and 49 upon an increase in driving resistance of shaft 62. A gear 67 is keyed or otherwise secured to shaft 62 having a constant mesh with gear 28.

Overrunning clutches 23 and 29 are similar in construction and may be of any well known design, but in the present embodiment are constructed as shown in Fig. 2, wherein shaft 24 may overrun gear 28 when rotated in a clockwise direction and will be driven by gear 28 when a clockwise direction of gear 28 relative to the shaft 24 wedges the rollers 68 within the tapered grooves 69.

In the operation of the transmission, assuming that the transmission is installed on a motor vehicle and the various parts are in the position shown in Fig. 1, the drive is from shaft 13 to the shaft 34 through the engaged clutch plates 36 and the shafts 18 and 24, the shaft 24 being free to overrun gears 22 and 28 by reason of overrunning clutches 23 and 29.

If for any reason a load sufficient to compress spring 26 should be applied to shaft 24, shaft 18 will thread thereon and move thrust washers 41 toward the right to contact the member 38 and disengage the clutch plates 36. Disengagement of the clutch causes gear 28 to pick up the load and the drive thereafter is at a decreased speed ratio through gears 16, 56, 67 and 28.

If the load on shaft 24 be increased still further, spring 58 is collapsed by relative movement of threaded shafts 49 and 51, and the clutch plates within the housing 61 are released by movement of the clutch housing toward the left, and thereafter the drive is by means of gears 16, 56, 57, and 22, it being understood that with the last mentioned drive, shaft 24 will be driven at a still lower speed and a corresponding increase in driving torque.

It will be understood from the above description that if the resistance of shaft 24 is decreased, the successive steps will be in a reverse direction and at a predetermined load, the parts will arrive in the position illustrated in Figure 1, wherein the main shaft portions are directly connected and the transmission is in the high gear position.

Spring 26 is more easily compressed than spring 58, in order that the high speed clutch mounted on shaft 18 may be disengaged, before the second speed clutch mounted on shaft 62 is disengaged. The transmission is shown in the at-rest position which also corresponds to the high speed position in so far as the clutches are concerned, although it is obvious that rotation of the shafts will change the position of weights 44.

In the second speed position shafts 18 and 24 are telescoped a sufficient amount to release the high speed clutch by compression of spring 26, but shafts 49 and 51 remain in the position shown because of the greater force of spring 58. Telescoping of shafts 18 and 24 disengages the high speed clutch, but as the load is not great enough to compress spring 58, the second speed clutch remains engaged and the drive from shaft 13 is taken by gears 16 and 56 to shaft 49 through thread 55 to shaft 51 and through the second speed clutch and gears 67 and 28 to the shaft 24.

In the low speed position both springs 26 and 58 are compressed and as both clutches are disengaged, the drive from shaft 13 is through gears 16 and 56 to shaft 49 through thread 55 to shaft 51 and through gears 57 and 22 to shaft 18. From shaft 18, the drive is taken through thread 21 to shaft 24.

Both the high and second speed friction clutches are released by the telescoping of the shafts, but the action is slightly different. The high speed clutch is released by movement toward the right of shaft 18 and the second speed clutch is released by movement toward the left of housing 61. The clutches are preferably of the plate type because this type of clutch requires a very small movement to completely release the friction members.

It will be apparent that as the rotating speed of shaft 13 is increased, the centrifugal force of weights 44 will also be increased and that by a proper selection of weights 44 and spring 47, the resistance of the main clutch to disengagement may be increased to a point whereby, above a predetermined speed, the entire driving torque of shaft 13 may be delivered by the clutch and no gear changes will occur at the speeds above the predetermined value.

The incorporation of the centrifugal weights is advised in that it is not desirable to change the driving ratio at engine speeds corresponding substantially to the maximum vehicle velocity.

While a preferred embodiment of the invention has been illustrated and described, it is understood that various changes may be made without departing from the spirit and scope of the invention; for example, other types and forms of releasable and overrunning clutches may be employed and other types of known connections between the shafts may be substituted for the present geared connections. Other changes will be apparent to those skilled in the art, and therefore the invention is not regarded as limited to the form illustrated and described, or otherwise, except by the terms of the following claims:

What is claimed is:

1. A power transmission mechanism comprising a driving shaft, a driven shaft, means for directly connecting and disconnecting the shafts, means for connecting the shafts in a predetermined driving ratio, means for connecting the shafts in a second predetermined ratio, said last two means including overrunning devices, means operated by the resistance of the driven shaft for disengaging two of said connecting means at predetermined resistance values, and means actuated in accordance with driving shaft speed for increasing the resistance of the direct connecting means to disengagement.

2. A power transmission mechanism comprising a driving shaft, a driven shaft, means for directly connecting and disconnecting the shafts, means for connecting the shafts in a predetermined driving ratio, means for connecting the shafts in a second predetermined ratio, said last two means including overrunning devices, means operated by the resistance of the driven shaft for disengaging two of said connecting means at predetermined resistance values, and a centrifugal member on the driving shaft for increasing the resistance of the direct connecting means against disengagement as the speed of the driving shaft is increased.

3. A power transmission mechanism comprising a driving shaft, a driven shaft coaxial therewith, a clutch connecting the shafts, means actuated by the resistance of the driven shaft for disengaging the clutch, a counter shaft having a geared connection to the driving shaft, an overrunning clutch between the counter shaft and the driven shaft, a second countershaft coaxial with the first having a geared connection with the driven shaft, an overrunning clutch between the second counter shaft and the driven shaft, and a load resistance actuated clutch between the counter shafts.

4. A power transmission mechanism comprising a driving shaft, a driven shaft coaxial therewith, a clutch connecting the shafts, means actuated by the resistance of the driven shaft for disengaging the clutch, a counter shaft having a geared connection to the driven shaft, an overrunning clutch between the counter shaft and the driven shaft, a second counter shaft coaxial with the first having a geared connection with the driven shaft, an overrunning clutch between the second counter shaft and the driven shaft, a load resistance actuated clutch between the counter shafts, and means responsive to clutch speed for increasing the resistance to disengagement of the clutch between the driving and driven shafts.

5. A power transmission mechanism comprising a driving shaft, a driven shaft, a clutch connecting the shafts, said driven shaft including two aligned portions having a threaded engagement, said portions having relative axial movement, means for disengaging the clutch by relative axial movement of the portions, a counter shaft having a geared connection with the driving and driven shafts on opposite sides of the clutch, said geared connection including an overrunning clutch, and means for increasing the resistance of the clutch to disengagement, as the speed of the clutch is increased.

6. An automatic transmission mechanism comprising a driving shaft, a driven shaft, an intermediate shaft connecting the driven and driving shafts including two threaded portions and a clutch operated by relative axial movement of the threaded portions adapted to disengage the driving shaft from the intermediate shaft in accordance with the load on the driven shaft, a counter shaft driven by the driving shaft, a pair of meshed gears connecting said counter shaft and intermediate shaft including an overrunning clutch, a second pair of gears including an overrunning clutch connecting the counter shaft to the driven shaft, and a clutch operable by torque reaction to operably connect and disconnect the second pair of gears from the counter shaft, said clutches being operable at predetermined driven shaft loads of different value.

7. An automatic transmission mechanism comprising a driving shaft, a driven shaft, an intermediate shaft connecting the driven and driving shafts including two threaded portions and a clutch operated by relative axial movement of the threaded portions adapted to disengage the driving shaft from the intermediate shaft in accordance with the load on the driven shaft, a counter shaft driven by the driving shaft, a pair of meshed gears connecting said countershaft and intermediate shaft including an overrunning clutch, a second pair of gears including an overrunning clutch connecting the counter shaft to the driven shaft, and a clutch operable by torque reaction to operably connect and disconnect the second pair of gears from the countershaft, said clutches being operable at predetermined driven shaft loads of different value, and means for increasing the resistance of one clutch to disengagement in accordance with clutch speed.

8. An automatic transmission mechanism comprising a driving shaft, a driven shaft in alignment therewith, a pair of aligned counter shafts adapted to connect the driving and driven shafts in three different gear ratios, said driving and driven shafts being connected to the counter shafts by three pairs of meshed gears, two pairs of which include overrunning clutches, and said aligned pairs of shafts being connected together by a pair of threaded portions and a friction clutch adapted to progressively disconnect two of the driving ratios as the load on the driven shaft increases.

9. A power transmission mechanism comprising a driving shaft, a gear thereon, a driven shaft aligned therewith, a gear having an overrunning clutch on the driven shaft, a counter shaft having gears thereon meshing with each of said first mentioned gears, a centrifugal friction clutch connecting said driving and driven shafts, said clutch being arranged between said driving shaft and driven shaft gears, and means for disengaging and engaging said clutch in accordance with the load upon the driven shaft.

10. A power transmission mechanism, comprising a driving shaft, a gear thereon, a driven shaft aligned therewith, a gear having an overrunning clutch on the driven shaft, a counter shaft having gears thereon meshing with each of said first mentioned gears, a friction clutch connecting said driving and driven shafts, said clutch being arranged between said driving shaft and driven shaft gears, means for disengaging and engaging said clutch in accordance with the load upon the driven shaft, and centrifugal means for varying the effect of the engaging and disengaging means in accordance with the speed of one of said shafts.

11. A power transmission mechanism comprising a driving shaft, a driven shaft, means for directly connecting and disconnecting the shafts, means for connecting the shafts in a predetermined driving ratio, means for connecting the shafts in a second predetermined ratio, said last two means including overrunning devices, means operated by the resistance of the driven shaft for progressively disengaging two of said connecting means at respectively different predetermined resistance values, and speed responsive means associated with the driving shaft for increasing the resistance of the direct connecting means against disengagement as the speed of the driving shaft is increased.

12. A power transmission mechanism comprising a driving shaft, a driven shaft coaxial therewith, a clutch connecting the shafts, means actuated by the resistance of the driven shaft for disengaging the clutch, a counter shaft having an operative connection to the driving shaft, an overrunning clutch between the counter shaft and the driven shaft, a second counter shaft coaxial with the first having an operative connection with the driven shaft, an overrunning clutch between the second counter shaft and the driven shaft, and a load resistance actuated clutch between the counter shafts.

13. A power transmission mechanism comprising a driving shaft, a driven shaft coaxial therewith, a clutch connecting the shafts, means actuated by the resistance of the driven shaft for disengaging the clutch, a counter shaft having an operative connection to the driving shaft, an overrunning clutch between the counter shaft and the driven shaft, a second counter shaft coaxial with the first having an operative connection with the driven shaft, an overrunning clutch between the second counter shaft and the driven shaft, a load resistance actuated clutch between the counter shafts, and means responsive to clutch speed for increasing the resistance to disengagement of the clutch between the driving and driven shafts.

14. A power transmission mechanism comprising a driving shaft, a driven shaft, a clutch connecting the shafts, said driven shaft including two aligned portions having a threaded engagement, said portions having relative axial movement, means for disengaging the clutch by relative axial movement of the portions, a counter shaft having an operative connection with the driving and driven shafts on opposite sides of the clutch, said operative connection including an overrunning clutch, and means for increasing the resistance of the clutch to disengagement as the speed of the clutch is increased.

RAYMOND P. LANSING.